United States Patent [19]

Holz et al.

[11] 4,230,967
[45] Oct. 28, 1980

[54] CATHODE RAY TUBE WITH TOUCH-SENSITIVE DISPLAY PANEL

[75] Inventors: George E. Holz, North Plainfield; James A. Ogle, Neshanic Station; George J. Przybylek, Warren, all of N.J.

[73] Assignee: Burroughs Corporation, Detroit, Mich.

[21] Appl. No.: 928,959

[22] Filed: Jul. 28, 1978

[51] Int. Cl.³ .................... H01J 29/26; H01G 7/00
[52] U.S. Cl. ................................. 315/3; 361/278; 361/280; 340/365 C
[58] Field of Search ............... 361/280, 278; 200/DIG. 1; 340/365 C; 315/3

[56] References Cited

U.S. PATENT DOCUMENTS

| | | | |
|---|---|---|---|
| 3,757,322 | 9/1973 | Barkan | 340/365 C |
| 3,778,817 | 12/1973 | Silverborg | 340/365 C |
| 4,110,749 | 8/1978 | Janko | 340/365 C |
| 4,136,291 | 1/1979 | Waldron | 361/280 X |

*Primary Examiner*—Elliot A. Goldberg
*Attorney, Agent, or Firm*—Kevin R. Peterson; Robert A. Green; Edward J. Feeney, Jr.

[57] ABSTRACT

The disclosure is of a cathode ray tube having a face plate for displaying information and carrying an electrode assembly which is curved to adhere smoothly to the face plate. The electrode assembly includes a shield against radio frequency interference and an insulating support sheet having an inner surface and an outer surface, on each of which an array of rows and columns of conductive areas is formed. On the inner surface, the rows of conductive areas are electrically connected together to output contact pads at a side edge of the sheet, and, on the outer surface, the columns of conductive areas are electrically connected together to output contact pads along the lower edge of the sheet. Each outer conductive area overlies and is capacitively coupled to an inner conductive area. A column conductor which extends from a contact pad at an edge of the outer surface of the sheet is capacitively coupled to each column of outer conductive areas. The conductive areas on the outer surface are intimately capacitively coupled to the column conductors so that optimum signal coupling is achieved.

5 Claims, 2 Drawing Figures

CATHODE RAY TUBE WITH TOUCH-SENSITIVE DISPLAY PANEL

BACKGROUND OF THE INVENTION

Touch-controlled display devices and systems are known in the art, and U.S. Pat. Nos. 3,757,322; 3,482,241; and 3,696,409 are examples of such devices and systems. However, optimum coupling of the various electrodes to provide the desired coupling of signals to the touch panels was not achieved.

This problem is overcome in the present invention by shaping the finger-operated electrodes and coupling them to their signal-input electrodes in such a way that favorable signal coupling is achieved.

DESCRIPTION OF THE PREFERRED EMBODIMENTS

Figure 1:
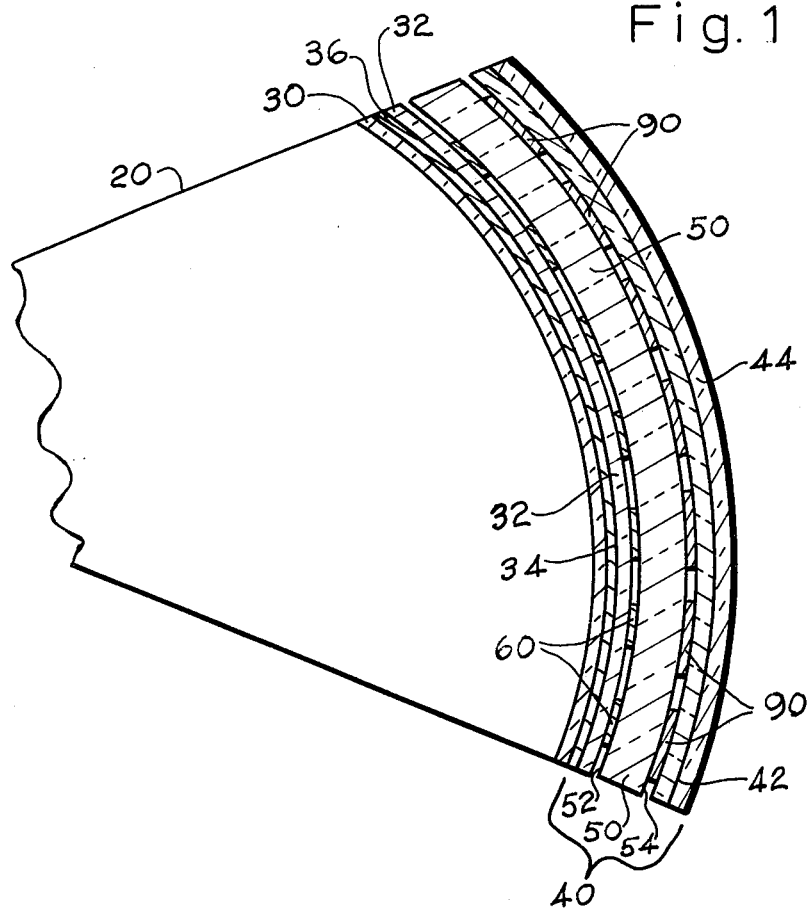
FIG. 1 is a sectional view of a cathode ray tube face plate and electrode assembly embodying the invention.
Figure 2:
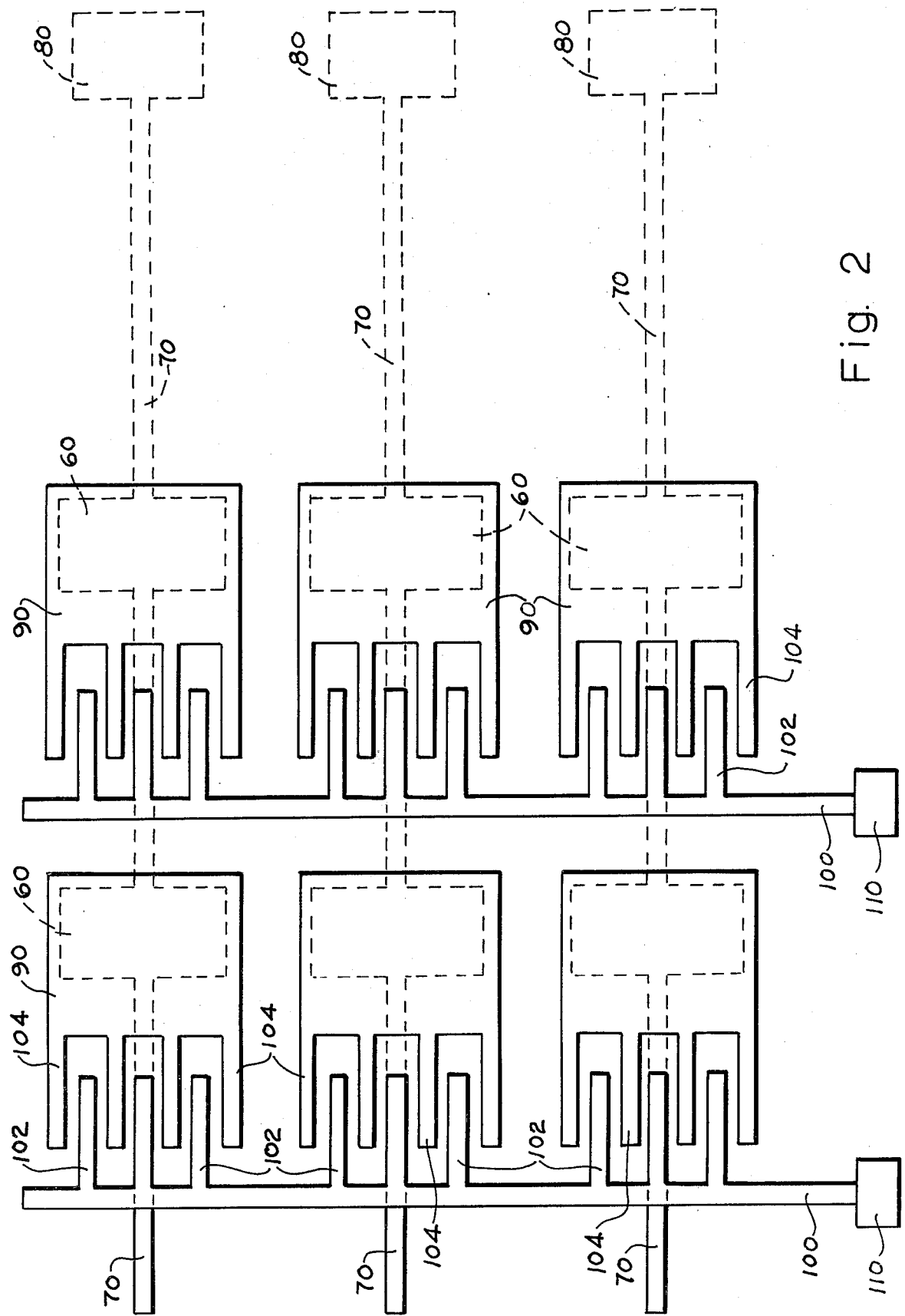
FIG. 2 is a plan view of the electrodes of the present invention.

Apparatus 10 embodying the invention comprises a cathode ray tube 20 having a phosphor-coated face plate 30, with an electronic assembly 40 embodying the invention secured to, or removably coupled to, the face plate but shaped to match the curvature of the face plate. The assembly 40 includes a sheet of glass 32 having, on its inner surface, a transparent conductive layer 36 of tin oxide or the like which acts as a radio frequency interference shield. The assembly 40 also includes a sheet 50 of insulating material, for example, glass, which carries on its inner surface 52 an array of transparent conductive film areas or electrodes 60 disposed in rows and columns. Each row of electrodes 60 is electrically connected by a conductor 70 (FIG. 2) to a contact pad 80 at an edge of the glass plate. The outer surface 54 of the glass plate is similarly provided with an array of rows and columns of transparent conductive film areas or electrodes 90, each area 90 overlying and aligned with one of the areas 60 on the inner surface. A column conductor 100, or strobe line, is provided for each column of conductive film areas and is capacitively coupled by means of conductive fingers 102 which are closely interleaved with, but are spaced from, conductive fingers 104 which extend from each of the outer areas, as illustrated in FIG. 1 and in greater detail in FIG. 3. Each column conductor 100 extends to a conductive contact pad 110 at the lower edge of the glass plate.

The interleaving of the conductive fingers 102 and 104 provides efficient coupling between the column conductors 100 and the conductors 90. A layer 42 of a clear dielectric is provided over the outer surface of plate 50 for insulating purposes.

The assembly 40 is prepared according to a method described in an application by George Przybylek, the application being entitled Touch-Sensitive Display Panel and Method of Making It, filed concurrently herewith, and incorporated herein by reference. Briefly, the assembly 40 is prepared by coating both surfaces of a flat glass plate with a layer of indium-tin-oxide, screening resist patterns on the inner and outer surfaces, and then etching to provide the electrodes 60 and 90 described above. The layer 42 is provided and the flat plate thus treated is placed in a suitably shaped mold, and it is heated sufficiently to cause it to sag to conform to the shape of the cathode ray tube face plate 30. In the past, such curved assemblies had to be formed by first curving the glass plate and then forming electrodes thereon; the art did not permit forming the electrodes on a flat plate and then curving the plate.

If desired, an anti-reflection coating 44 may be provided on the outer surface of the assembly 40.

The operation of the invention is described in detail and claimed in an application of George E. Holz entitled Touch Panel and Operating System, filed concurrently herewith, and incorporated herein by reference. For a brief description of the operation of the invention, positive pulses are applied to each of the column conductors 100 in turn and thus to each of the outer conductive areas 90. The pulses couple through to the rear conductors and are sensed as being present on sense lines 70 by appropriate electronics including a computer. When the operator desires to display a unit of information, he touches his finger to the proper outer conductive area 90, and this decouples the applied pulse from the underlying inner area 60 and provides a zero output at the associated row and column contact pad 80. This output or switch closure is coupled through the associated circuitry, where the closure is computer-analyzed and activates a pertinent response which may be to display information on the CRT or activate an electronic circuit.

The optimum relationship of the electrodes is such that there is good signal coupling (1) from conductor 100 and fingers 102 to fingers 104 and electrode 90, and (2) from electrode 90 to electrode 60. At the same time, there should be poor coupling from conductor 100 to conductor 70 and from conductor 100 and fingers 102 to electrode 60. The desired coupling is achieved by having fingers 102 and 104 close to each other, by having conductor 70 rather narrow, and by having electrode area 60 positioned as far as possible from conductor 100 and fingers 102 while maintaining a favorable relationship with the overlying electrode 90. This permits an optimum amount of signal to be removed by the operator's finger and prevented from being coupled through to the sense line when a conductive area 90 is touched.

What is claimed is:

1. A touch panel assembly comprising
   an insulating plate having an outer surface and an inner surface,
   a plurality of narrow column conductors on said outer surface and a column of first relatively large-area transparent electrodes disposed adjacent to each of said column conductors, said first electrodes also being aligned in rows,
   interleaved means intimately coupling each column conductor to the column of first large-area electrodes adjacent to it,
   a plurality of rows of second large-area transparent electrodes on the inner surface of said plate, each second electrode lying beneath a first electrode on the outer surface and being capacitively coupled thereto, and
   a narrow row conductor extending along and coupling together the second electrodes in each row on said inner surface.

2. A touch panel assembly comprising
   an insulating plate having an outer surface and an inner surface, a plurality of narrow column conductors on said outer surface and a column of first relatively large-area transparent electrodes disposed adjacent to each of said column conductors, said first electrodes also being aligned in rows, a plurality of conductive fingers extending from each column conductor to a first electrode adjacent to it, and a plurality of conductive fingers extending from each first electrode toward the column conductor adjacent to it, said first and second fingers being interleaved with each other and disposed in good capacitive coupling relationship while spaced apart a small distance, a plurality of rows of second large-area transparent electrodes on the inner surface of said plate, each second electrode lying beneath a first electrode on the outer surface and being capacitively coupled thereto, and a narrow row conductor extending along and coupling together the second electrodes in each row on said inner surface.

3. The assembly defined in claim 2 wherein each column conductor has a contact pad to which external electrical contact can be made and each row conductor has a contact pad to which external electrical contact can be made.

4. The assembly defined in claim 2 wherein each column conductor has an end at which a contact pad is provided to which external electrical contact can be made, and each row conductor has an end at which a contact pad is provided to which external electrical contact can be made.

5. A cathode ray tube including
a face plate,
a touch panel assembly on said face plate comprising
an insulating plate, adjacent to said face plate, having an outer surface and an inner surface,
a plurality of narrow column conductors on said outer surface and a column of first relatively large-area transparent electrodes disposed adjacent to each of said column conductors, said first electrodes also being aligned in rows,
interleaved means intimately coupling each column conductor to the column of first large-area electrodes adjacent to it,
a plurality of rows of second large-area transparent electrodes on the inner surface of said plate, each second electrode lying beneath a first electrode on the outer surface and being capacitively coupled thereto, and
a narrow row conductor extending along and coupling together the second electrodes in each row on said inner surface.

* * * * *